J. B. WICKERSHAM.
Folding Bedstead.
No. 1,102. Reissued Dec. 18, 1860.
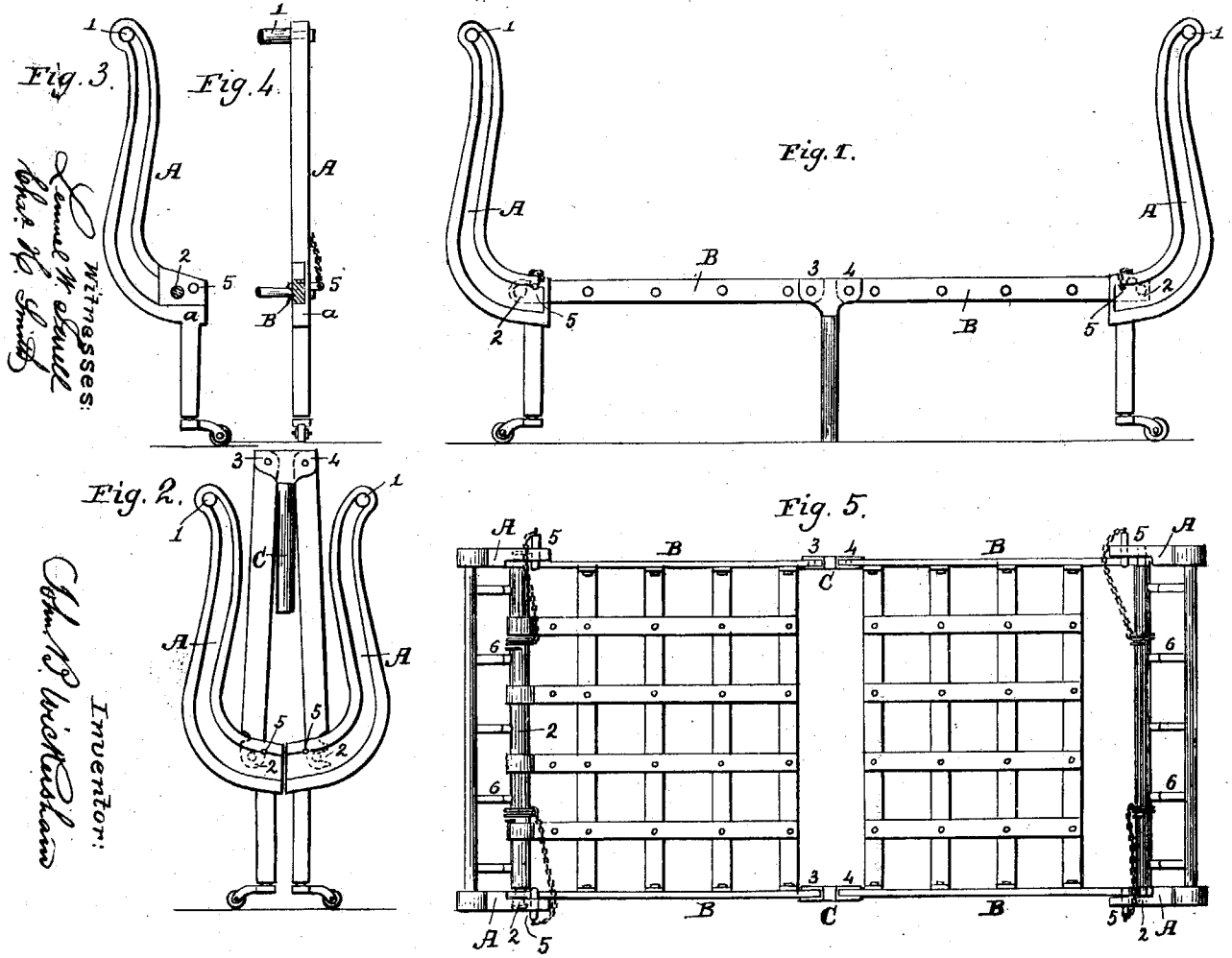
N. PETERS, Photo-Lithographer, Washington, D. C.

UNITED STATES PATENT OFFICE.

JOHN B. WICKERSHAM, OF BROOKLYN, NEW YORK.

IMPROVED FOLDING BEDSTEAD.

Specification forming part of Letters Patent No. 17,460, dated June 2, 1857; Reissue No. 1,102, dated December 18, 1860.

DIVISION NO. 2.

*To all whom it may concern:*

Be it known that I, JOHN B. WICKERSHAM, of Brooklyn, in the county of Kings and State of New York, have invented, made, and applied to use a new and useful Improvement in Folding or Portable Iron Bedsteads; and I do hereby declare that the following is a full, clear, and exact description of the construction and operation of the same, reference being had to the annexed drawings, making part of this specification, wherein—

Figure 1 is a side elevation of an iron bedstead with my improvement as open ready for use. Fig. 2 is an elevation of the same in its closed position or folded up. Fig. 3 is an elevation of the inner side of one of the legs. Fig. 4 is an edge view of the same. Fig. 5 is a plan of the bedstead as opened for use.

Similar marks of reference denote the same parts.

Metallic bedsteads have been constructed in such a manner as to fold up; and to show the distinction between my construction of bedstead and others I will briefly describe the parts that have been employed before my said invention.

A short projecting bar or plate with two holes has heretofore been riveted onto each post of the bedstead and each of the horizontal rails has been provided with two similar holes. Through the end holes a tie-rod has been passed that became a center-pin on which to fold up the bedstead, and then by the insertion of a pin through the respective pairs of coinciding holes the bedstead has been retained in an unfolded position; but this construction involved difficulties and was unreliable; difficult on account of getting the holes for the pins to match, particularly when the bedstead gets bent or twisted, as is often the case; unreliable, because all the strain comes on the pins, and the bedstead falls down unless the pins are inserted. The pins have also been thrown in by springs; but the same objections apply to this method, and the cost is considerably enhanced.

The nature of one portion of my said invention consists in attaching the side rails directly to the post by a permanent joint, thereby avoiding the use of the separate projecting bars or plates in use before my said invention. And my said invention also relates to connecting the wire or metallic work forming the head or foot guards to the cross-bar upon which the side rails and parts turn, thereby avoiding a separate cross-bar heretofore used at the lower part of said head or foot guards, so that by this construction the bed-clothes are not only better supported by the curved form given to said metallic work of the head and foot guards, but the bedstead is lighter and cheaper.

The bedstead is to be of any width or length, and the parts may be formed more or less ornamental.

A A are the metallic posts, connected by rods 1 and 2, to form either the head or foot guard. B B are the side rails, jointed at 3 and 4 to the short legs C in the usual manner, so that when unfolded the square points of the shoulders abut against said leg and retain the same vertically. *a* is a shoulder or support formed on or by a recess in the post A, against which the rails B at or near their ends rest, and the rods 2 pass through holes in the ends of the rails B in such a manner as to allow the bedstead to assume a folded or unfolded position by the rails B being turned on said rods, as shown. And for convenience of transportation the rails B at one end may be notched above the hole, so as to allow the same to be unhooked, the longitudinal sacking-bars being stopped short of the bar 2, upon which the parts turn, so as to allow for disconnecting.

5 5 are movable pins inserted through corresponding holes above the rails B when the bedstead is in an unfolded position to confine said rails to the shoulder *a*, and the upper part of the rails B may be slightly notched to pass the said pin or not, provided the casting of the post be sufficiently wide to allow room for the pin entirely above said rail, which latter arrangement I prefer, as preserving the entire strength of the rail B.

By reference to Figs. 3 and 5 it will be seen that the cross-bars 2 2 perform two functions, the one to connect the folding bottom of the bedstead to the head or foot guards or boards, the other to receive directly the metallic work 6 6, forming the head and foot-guards themselves, thereby avoiding the use of a second cross-bar at this point, which was in use for this purpose before my said invention.

I am aware that before my said invention and patent a short projecting bar or plate had been riveted onto each post to receive the ends of the side rails as aforesaid. This involved the labor and cost of fitting and attaching four such bars or plates upon a bedstead, one at each post; but I am not aware of any previous instance in which the metallic side rails of a vertical folding bedstead have been jointed directly to the posts, whereby the separate pieces and attendant labor are dispensed with, in consequence of the metal posts being adapted to said folding side rails.

What I claim, and desire to secure by Letters Patent, is—

Connecting the wire or metallic work 6 6, forming the head or foot guards, to the cross-bar 2, upon which the parts turn, as set forth.

JOHN B. WICKERSHAM.

Witnesses:
LEMUEL W. SERRELL,
CHAS. H. SMITH.